US008994687B2

(12) United States Patent
Yeh et al.

(10) Patent No.: US 8,994,687 B2
(45) Date of Patent: Mar. 31, 2015

(54) MUTUAL-CAPACITANCE TOUCH SENSING DEVICE AND ELECTRONIC SYSTEM INCLUDING THE SAME

(75) Inventors: Ting-Hao Yeh, Hsinchu (TW); Fu-Sheng Chang, Caotun Township (TW)

(73) Assignee: MStar Semiconductor, Inc, Hsinchu Hsien (TW)

( * ) Notice: Subject to any disclaimer, the term of this patent is extended or adjusted under 35 U.S.C. 154(b) by 406 days.

(21) Appl. No.: 13/604,875

(22) Filed: Sep. 6, 2012

(65) Prior Publication Data

US 2013/0088459 A1 Apr. 11, 2013

(30) Foreign Application Priority Data

Oct. 6, 2011 (TW) ............................ 100136361 A

(51) Int. Cl.
*G06F 3/045* (2006.01)
*G06F 3/044* (2006.01)

(52) U.S. Cl.
CPC ...... *G06F 3/044* (2013.01); *G06F 2203/04111* (2013.01); *G06F 2203/04112* (2013.01)
USPC .......................................................... 345/174

(58) Field of Classification Search
None
See application file for complete search history.

(56) References Cited

U.S. PATENT DOCUMENTS

2004/0239650 A1 12/2004 MacKey
2012/0229414 A1* 9/2012 Ellis ............................. 345/174

OTHER PUBLICATIONS

Taiwanese Office Action dated Mar. 20, 2014, Priority No. 100136361.

* cited by examiner

*Primary Examiner* — Nicholas Lee
(74) *Attorney, Agent, or Firm* — Edell, Shapiro & Finnan, LLC

(57) ABSTRACT

A mutual-capacitance touch sensing device including a touch panel, a plurality of driving electrodes and a plurality of sensing electrodes is provided. The touch panel is substantially parallel to a reference plane. The driving and sensing electrodes are arranged to from a matrix including a plurality of sensing units. Each of the sensing units is associated with at least one driving electrode and at least one sensing electrode. A gap is formed between the at least one driving electrode and the at least one sensing electrodes. A projection length of the gap on the reference plane is longer than a total length of two diagonal lines in each of the sensing units.

21 Claims, 13 Drawing Sheets

X
Y
44
44
42
42

MUTUAL-CAPACITANCE TOUCH SENSING DEVICE AND ELECTRONIC SYSTEM INCLUDING THE SAME

This application claims the benefit of Taiwan application Serial No. 100136361, filed Oct. 6, 2011, the subject matter of which is incorporated herein by reference.

BACKGROUND OF THE INVENTION

1. Field of the Invention

The invention relates in general to a touch sensing technique, and more particularly, to techniques for reinforcing immunity from noise for a touch sensing device.

2. Description of the Related Art

Operating interfaces of recent electronic products are becoming increasingly user-friendly and intuitive. For example, through a touch screen, a user can directly interact with applications as well as input messages/texts/patterns with fingers or a stylus, thus eliminating complications associated with other input devices such as a keyboard or buttons. In practice, a touch screen usually comprises a touch panel and a display provided at the back of the touch panel. According to a touch position on the touch panel and a currently displayed image on the display, an electronic device determines an intention of the touch to execute corresponding operations. Existing touch sensing techniques are roughly categorized into resistive, capacitive, electromagnetic, ultrasonic and optic types; among which, the mutual-capacitance touch sensing technique prevails in supporting multi-touch, and has been widely adopted in many products during the recent years.

A mutual-capacitive touch panel comprises a plurality of electrodes made of a transparent conductive material, with the electrodes being alternately arranged on the entire touch panel. Referring to FIG. 1A showing a top view of a touch panel of the prior art, a plurality of electrodes 12 in an X direction are driving electrodes, and a plurality of electrodes 14 in a Y direction are sensing electrodes. The two types of different electrodes form a matrix pattern comprising a plurality of sensing units. As shown in FIG. 1A, each of the row driving electrodes 12 is connected to a driver 16, and each of the column sensing electrodes 14 is connected to a receiver 18. In general, the drivers 16 sequentially send out driving signals that are then continuously received by the receivers 18.

FIG. 1B is a detail view of FIG. 1A, and FIG. 10 is a front view of FIG. 1B. A sensing unit 20 is defined by one driving electrode 12 and one sensing electrode 14, as shown in FIG. 1B. In this prior art, the driving electrode 12 and the sensing electrode 14 are provided on two different planes that are parallel to each other and vertical, i.e., perpendicular, to a Z direction. Since the two types of electrodes are designed to have different levels, a predetermined number of power lines 32 are present between the two types of electrodes. When a finger 30 approaches the sensing unit 20, a part of the power lines 32 between the driving electrode 12 and the sensing electrode 14 are attracted by the finger 30 due to a ground-like effect, such that the mutual capacitance between the driving electrode 12 and the sensing electrode 14 decreases to result in a mutual capacitance variation, which is then reflected by an output signal from the receiver 18 connected to the sensing electrode 14. According to a position of the receiver 18 and a position of a driver 16 sending out a driving signal at the time of the touch, a subsequent circuit determines an X/Y coordinate of the touch point.

It should be noted that power lines that are affected by the finger 30 are mainly distributed in areas 22A and 22B in FIG. 1B, i.e., two edge areas of an intersection of the driving electrode 12 and the sensing electrode 14 in the top view. Because of shielding effects, power lines below the intersection of the sensing electrode 14 and the driving electrode 12 are not largely affected by the finger 30. In other words, the above mutual capacitance variation mainly arises from variations in the power lines of the areas 22A and 22B.

In the prior art shown in FIG. 1A, the driving electrodes 12 and the sensing electrodes 14 are long strip-shaped electrodes having a same width. However, electrodes of current touch panels are not limited to such pattern; FIGS. 2A and 3A show two other current electrode patterns. In FIG. 2A, the driving electrodes 12 are wider than the sensing electrodes 14. However, for the sensing units in FIG. 2A, corresponding areas of power lines that are affected by user touch are similarly limited to two edge areas at an intersection of the driving electrode 12 and the sensing electrode 14, as areas 23A and 23B shown in FIG. 2B.

In FIG. 3A, the driving electrodes 12 and the sensing electrodes 14 are rhombuses. FIG. 3B is a detail view of FIG. 3A. Neighboring driving electrodes 12 of a same row are connected to one another through a bridge in an X direction; neighboring sensing electrodes 14 of a same column are connected to one another through a bridge in a Y direction. In this example, the sensing unit 20 is defined by two driving electrodes 12 and two sensing electrodes 14. For the sensing units 20 in FIG. 3B, mainly affected power lines by a user touch are distributed in areas 24A to 24D. As shown from FIG. 3B, the areas 24A to 24D are substantially neighboring ranges of diagonals lines of the sensing unit 20.

In order to provide touch sensing accuracy of a certain extent, areas of the sensing units 20 in FIGS. 1B, 2B and 3B are usually approximately the same, e.g., 5 mm by 5 mm. For a single sensing unit, immunity from noise interference gets larger as a mutual capacitance variation caused by a user gets larger, facilitating a subsequent circuit to determine a position of a touch point more accurately. In certain electronic systems supporting multi-touch, to enlarge the mutual capacitance variation for resisting against noise induced by multiple fingers, a potential between the driving electrode 12 and the sensing electrode 14 increases to 10 to 20 volts. Apart from high power consumption, such approach suffers from a drawback that associated circuits are required to withstand high voltages. As a result, hardware costs of such a touch screen are drastically increased.

SUMMARY OF THE INVENTION

In the view of the above issues, the invention is directed to a novel mutual-capacitive touch sensing device. Through appropriate designs on shapes and arrangements of driving electrodes and sensing electrodes, a same-sized sensing unit is allowed to effectively include more areas that are affected by a user touch, so as to increase a mutual capacitance variation to equivalently optimize a signal-to-noise ratio (SNR) of a sensing signal. Therefore, the mutual-capacitive touch sensing device and an electronic system including the same of the present invention have outstanding positioning accuracy as well as noise immunity. Compared to the conventional technique that adopts a large potential difference, the mutual-capacitive touch sensing device of the present invention is also more power saving with less hardware costs.

According to an embodiment of the present invention, a mutual-capacitive touch sensing device comprising a touch panel, a plurality of driving electrodes and a plurality of sensing electrodes is provided. The touch panel is substantially parallel to a reference plane. The driving and sensing electrodes are arranged to form a matrix comprising a plurality of sensing units. Each of the sensing units is associated with at least one driving electrode and at least one sensing electrode. A gap exists between the at least one driving electrode and the at least one sensing electrodes. A projection length of the gap on the reference plane is longer than a total length of two diagonal lines in each of the sensing units.

According to another embodiment of the present invention, an electronic system comprising a touch panel, a plurality of driving electrodes, a plurality of sensing electrodes, an analysis module and a control module is provided. The touch panel is substantially parallel to a reference plane. The driving and sensing electrodes are arranged to form a matrix comprising a plurality of sensing units. The analysis module determines which sensing unit is being touched. The control module determines a post-touch reaction of the electronic system in response to an analysis result provided by the analysis module. Each of the sensing units is associated with at least one driving electrode and at least one sensing electrode. A gap is formed between the at least one driving electrode and the at least one sensing electrodes. A projection length of the gap on the reference plane is longer than a total length of two diagonal lines in each of the sensing units.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
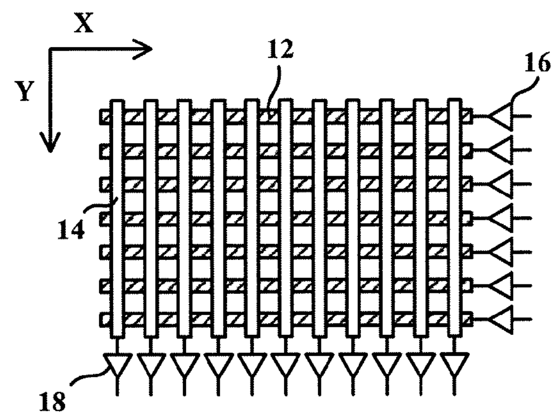
FIGS. 1A to 1C, FIGS. 2A and 2B, and FIGS. 3A and 3B are schematic diagrams of electrode patterns of conventional touch sensing devices.
Figure 1B:
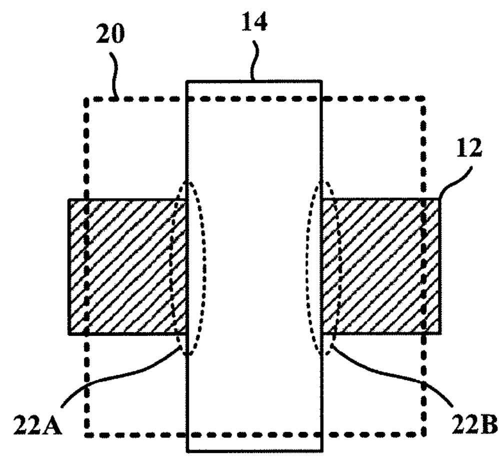
Figure 1C:
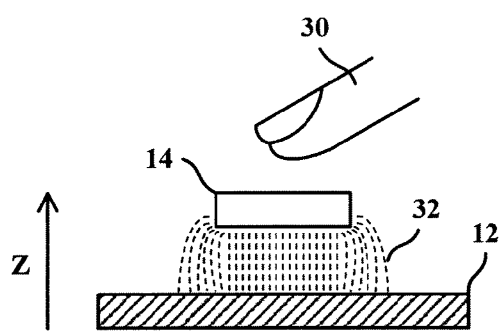
Figure 2A:
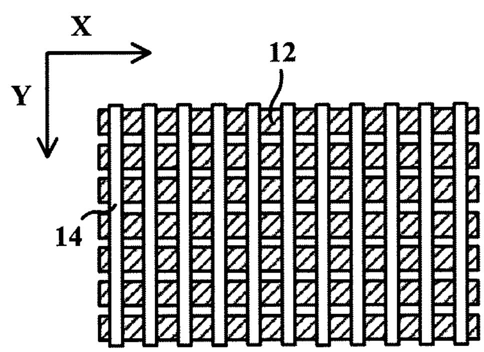
Figure 2B:
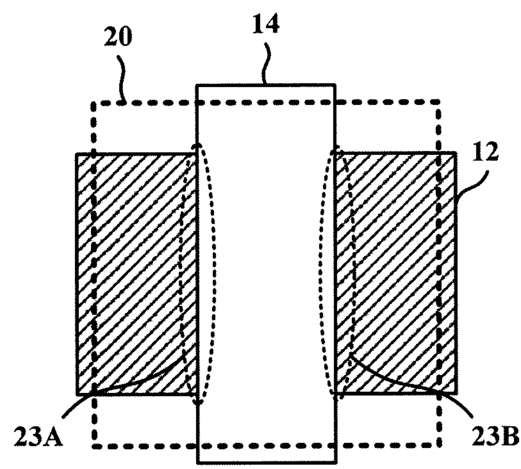
Figure 3A:
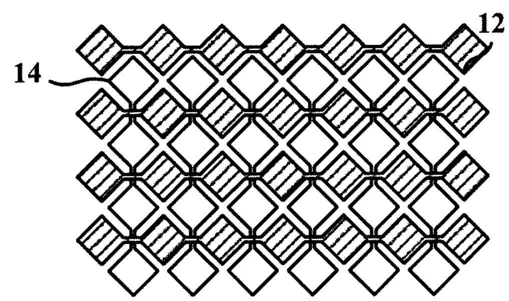
Figure 3B:
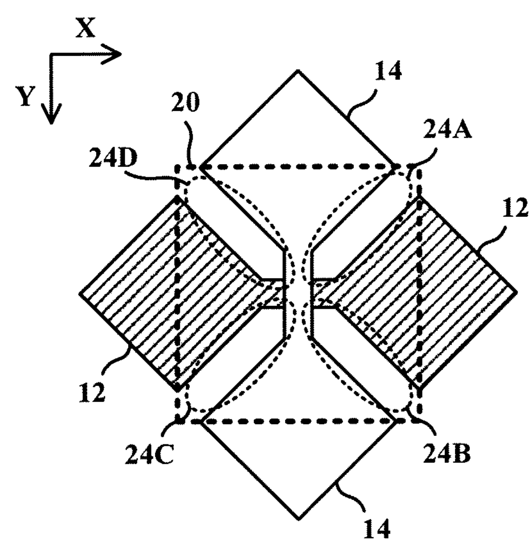

In the prior art in FIGS. 3A and 3B, a projection length of the gap between the two types of electrodes onto an X-Y plane equals to a total length of two diagonal lines in each of the sensing units 20, and this projection length is longer than a length of the areas 23A and 23B in FIG. 2B in the Y direction and is also longer than a length of the areas 22A and 22B in FIG. 1B in the Y direction. It is observed through simulation experiments that, with a same sensing unit size and electrode material, among the electrode patterns in FIGS. 1A-C, 2A-B and 3A-B, when receiving a same user touch, the mutual capacitance variation caused in the sensing unit from the largest to the smallest are the configurations shown in FIGS. 3A-B, FIGS. 2A-B, and FIGS. 1A-C, in that order.

From the above experimental results, in the sensing unit where power lines are distributed, by increasing the areas of the area affected by the user touch, a larger mutual capacitance variation can be generated by the sensing unit. Therefore, an essence of the present invention is that, through appropriate designs on shapes and arrangements of driving electrodes and sensing electrodes, a same-size sensing unit is allowed to include a larger effective area that is affected by a user touch.

Figure 4A:
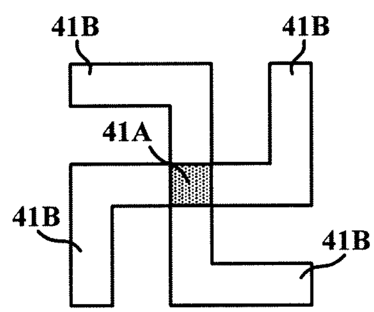
FIGS. 4A to 4C, FIGS. 5A to 5C, FIGS. 6A to 6C, FIGS. 7A to 7C, FIGS. 8A to 8C, and FIGS. 9A to 9C are schematic diagrams of a touch sensing device according to different embodiments of the present invention.
Figure 4B:
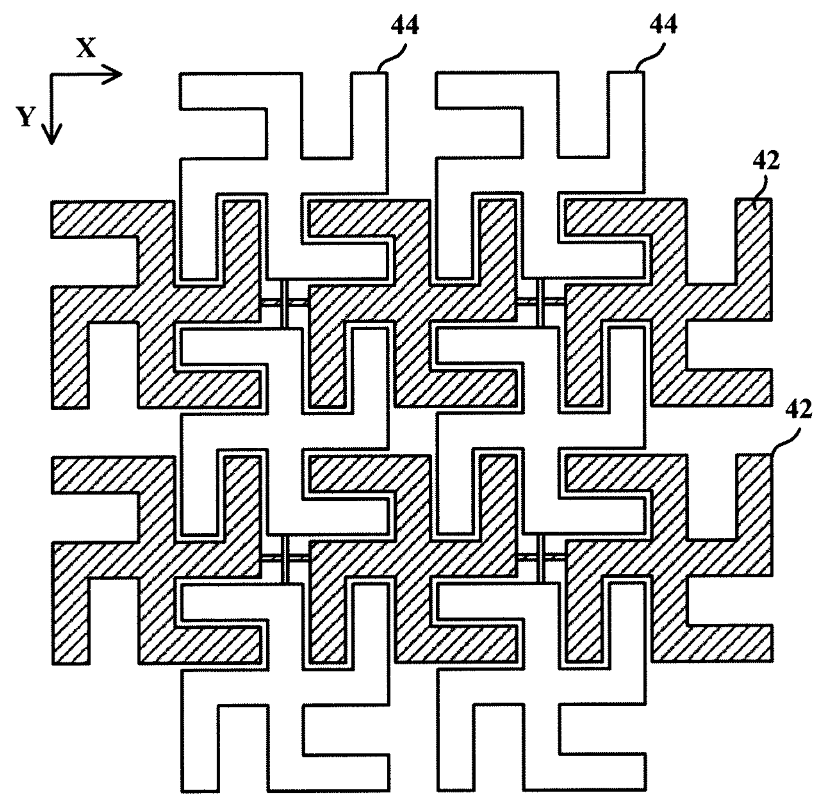

A mutual-capacitive touch sensing device is provided according to an embodiment of the present invention. In practice, the mutual-capacitive touch sensing device may be integrated to electronic systems including a mobile device, a tablet computer, a personal computer and an information display board. The mutual-capacitive touch sensing device comprises a touch panel, a plurality of driving electrodes and a plurality of sensing electrodes. FIG. 4A shows a schematic diagram of shapes of a single driving electrode and a single sensing electrode. FIG. 4B shows a schematic diagram of a configuration of the driving electrodes and the sensing electrodes according to this embodiment.

Referring to FIG. 4A, in this embodiment, each of the driving electrodes and each of the sensing electrodes respectively comprise a central area 41A and four extension areas 41B. The extension areas 41B are arranged to surround the central area 41A and are respectively connected to the central area 41A. As shown in FIG. 4B, neighboring driving electrodes 42 of a same row are connected to one another via a cross bridge in the X direction; neighboring sensing electrodes 44 of a same column are connected to one another via a cross bridge in the Y direction. The plurality of driving electrodes 42 and the plurality of sensing electrodes 44 form a matrix comprising a plurality of sensing units. Each of the sensing units is associated with at least one driving electrode 42 and at least one sensing electrode 44.

Figure 4C:
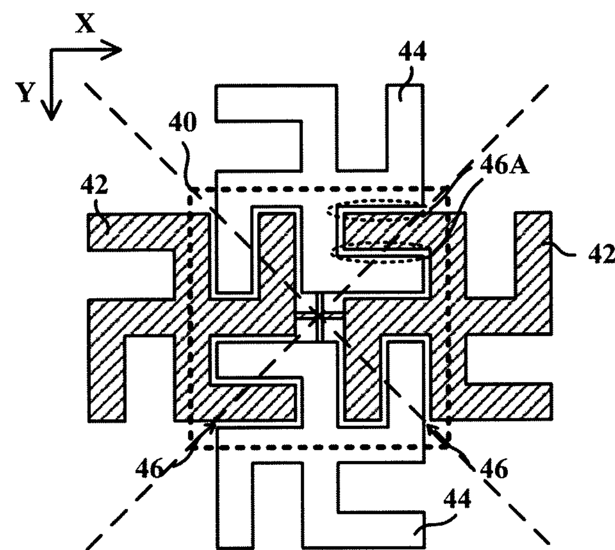

FIG. 4C is a detail view of FIG. 4B. In this embodiment, a sensing unit 40 is defined by two driving electrodes 42 and two sensing electrodes 44. In practice, the driving electrodes 42 and the sensing electrodes 44 may be provided on two different planes parallel to each other and vertical to the Z direction (which is also vertical, i.e., perpendicular, to the X direction and the Y direction at the same time), or may be substantially provided on a same plane. In other words, the mutual-capacitive touch sensing device of the present invention may be formed as a single-layer electrode structure or a double-layer electrode structure. Referring to FIG. 4C, regardless of which of the above two types is adopted, apart from overlapping parts at the cross bridges, a gap 46 lies between the driving electrodes 42 and the sensing electrodes 44 on the X-Y plane.

Due to different levels of the driving electrodes 42 and the sensing electrodes 44, power lines crossing the gap 46 are present. For the sensing unit 40, neighboring ranges of the gap 46 are most affected by a user touch regarding a power line distribution therein. As a projection length of the gap 46 projected onto the X-Y plane (i.e., a reference plane substantially parallel to the touch panel) gets longer, a range that can be affected by a user touch to contribute to a mutual capacitance variation becomes larger. It is apparent that the projection length of the gap 46 projected onto the X-Y plane is greater than a total length of two diagonal lines in the sensing unit 40. Also proven by experimental results, with a same sensing unit size and electrode material, the electrode design in FIG. 4B indeed provides a larger mutual capacitance variation compared to the prior art shown in FIGS. 1A-C, 2A-B and 3A-B.

In practice, the length of the gap is not the sole factor of the mutual capacitance variation in the sensing unit dependent on the electrode pattern. For example, a coupling effect between the two types of electrodes gets stronger as a projection width of the gap 46 projected onto the X-Y plane gets narrower, as a result, it is harder for a user touch to affect the power line distribution. In contrast, the amount of power lines between the two types of electrodes decreases as the width of the gap 46 gets larger, which also disfavors in generating a large mutual capacitance variation. In order to achieve a balance between the above considerations, according to an embodiment of the present invention, the width of the gap 46 projected onto the X-Y plane ranges from 0.03 um to 0.3 mm, and every two neighboring gap sections are designed to be 0.7 mm to 1 mm apart. The concept of the above measurements may also be applied to other embodiments to be described below.

Figure 5A:
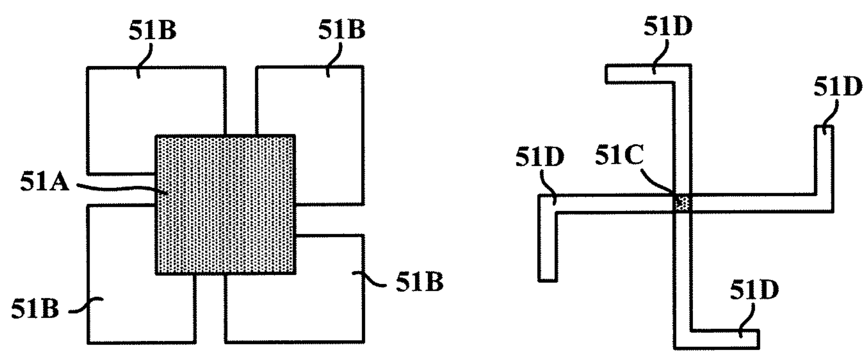
Figure 5B:
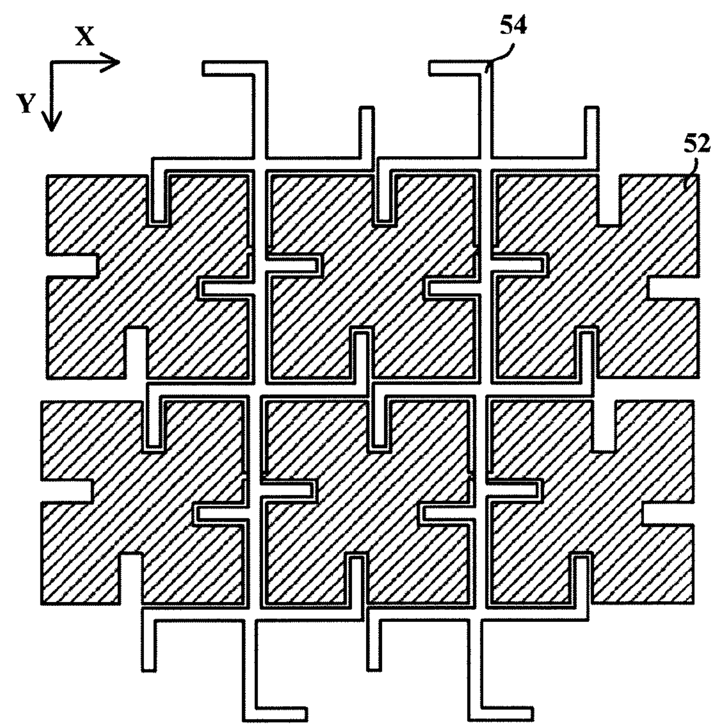
Figure 5C:
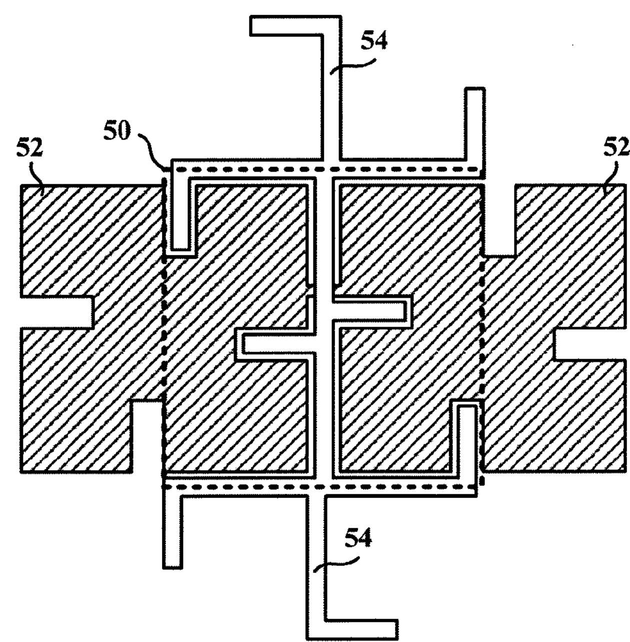

FIG. 5A shows a schematic diagram of a single driving electrode and a single sensing electrode according to another embodiment; FIG. 5B shows a schematic diagram of a configuration of driving electrodes and sensing electrodes according to this embodiment. As shown in FIG. 5A, each driving electrode comprises a central area 51A and four extension areas 51B, and each sensing electrode comprises a central area 51C and four extension areas 51D. It can be seen from the embodiment that the shapes of the two types of electrodes are not necessarily the same. The plurality of driving electrodes 52 and the plurality of sensing electrodes 54 form a matrix also comprising a plurality of sensing units. FIG. 5C is a detail view of FIG. 5B. In this embodiment, a sensing unit 50 is defined by two driving electrodes 52 and two sensing electrodes 54. Similarly, between the driving electrode 52 and the sensing electrode 54 lies a gap, which has a length longer than a total length of two diagonal lines in the sensing unit 50 when projected onto an X-Y plane.

Figure 6A:
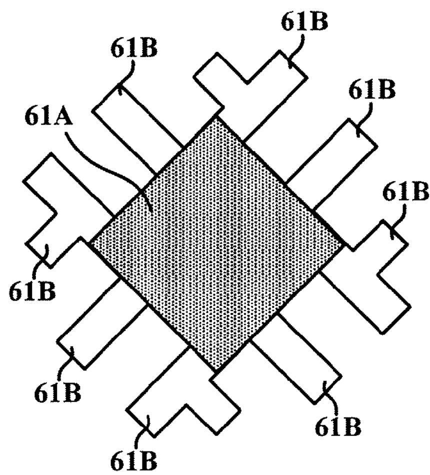
Figure 6B:
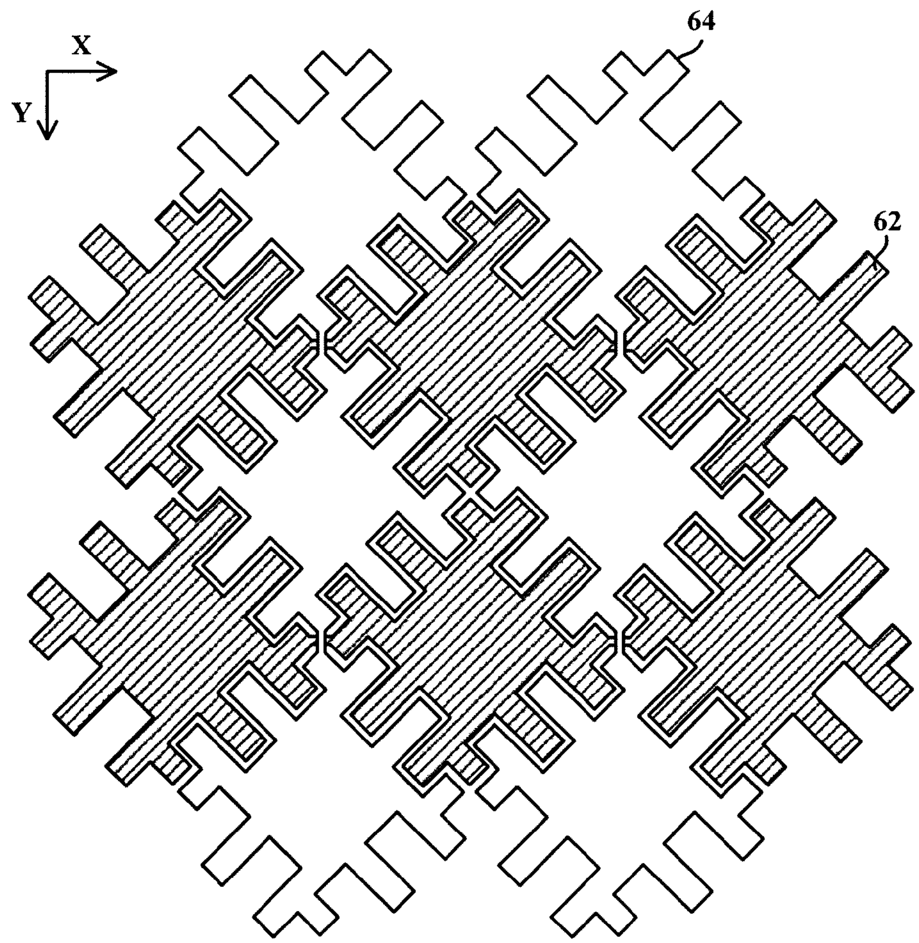
Figure 6C:
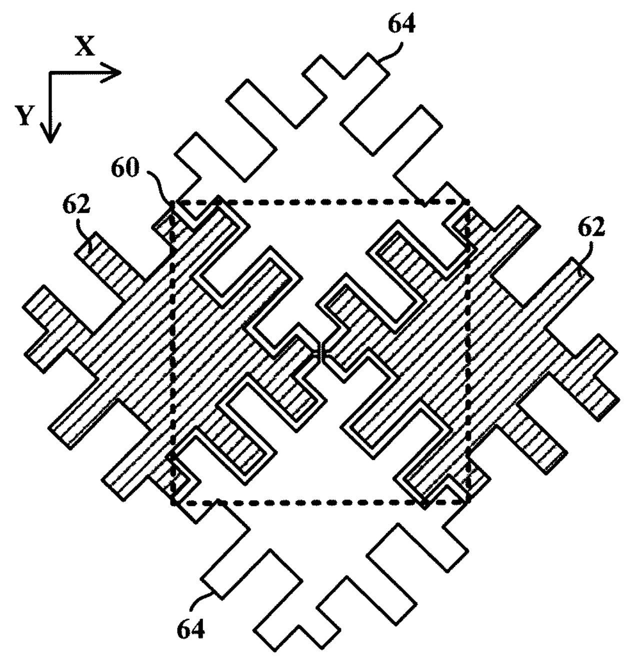

FIG. 6A shows a schematic diagram of a single electrode according to another embodiment; FIG. 6B shows a schematic diagram of a configuration of driving electrodes and sensing electrodes according to this embodiment. In this embodiment, each driving electrode and each sensing electrode respectively comprise a central area 61A and a plurality of extension areas 61B, as shown in FIG. 6A. It can be seen from this embodiment that the shape of the extension areas 61 B is not necessarily the same. The plurality of driving electrodes 62 and the plurality of sensing electrodes 64 form a matrix also comprising a plurality of sensing units. FIG. 6C is a detail view of FIG. 6B. In this embodiment, a sensing unit 60 is defined by two driving electrodes 62 and two sensing electrodes 64. Similarly, between the driving electrode 62 and the sensing electrode 64 lies a gap, which has a projection length, when projected onto an X-Y plane, longer than a total length of two diagonal lines in the sensing unit 60.

Figure 7A:
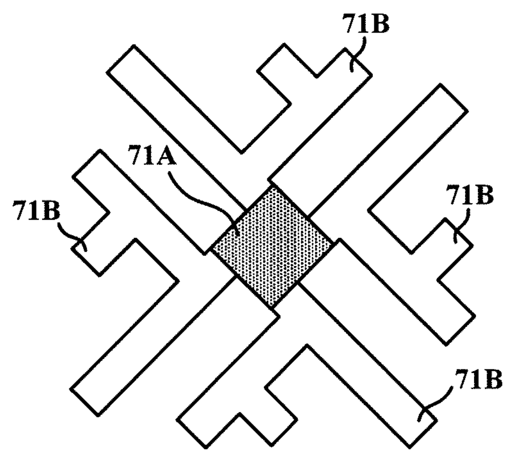
Figure 7B:
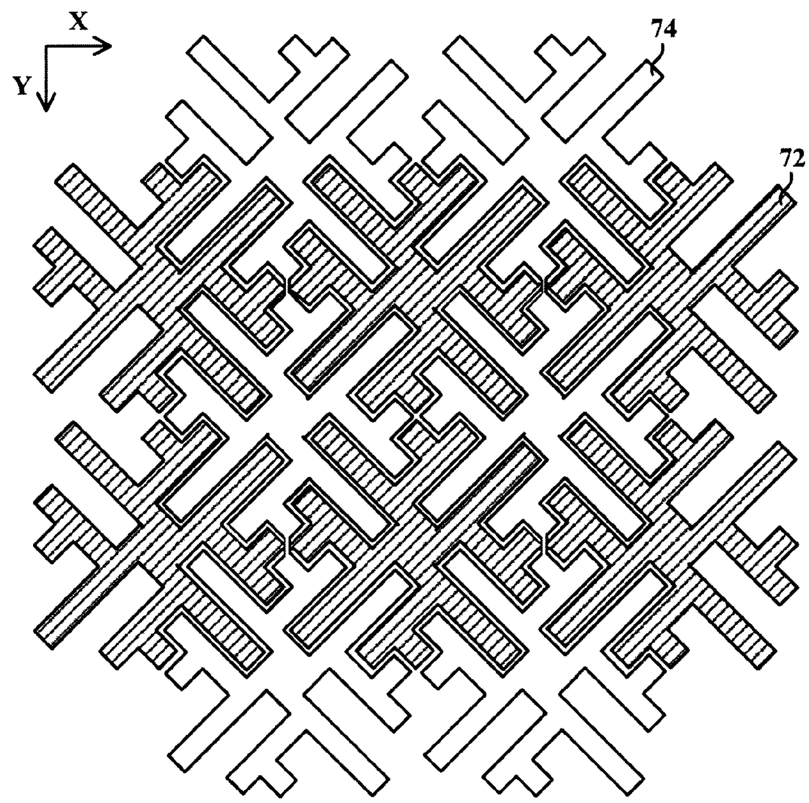
Figure 7C:
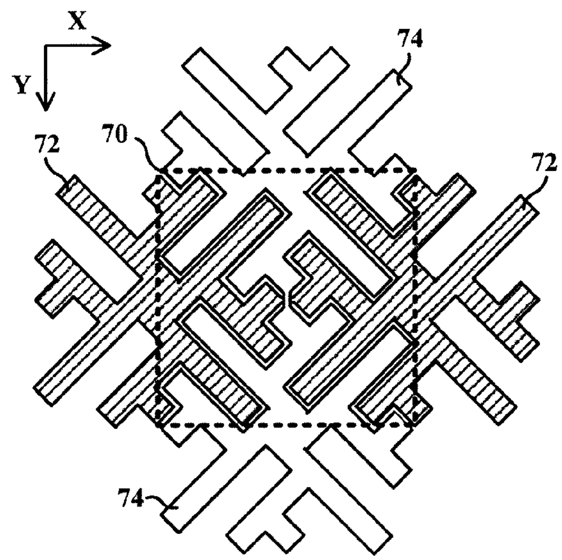

FIG. 7A shows a schematic diagram of a single electrode according to another embodiment; FIG. 7B shows a schematic diagram of a configuration of driving electrodes and sensing electrodes according to this embodiment. In this embodiment, each driving electrode and each sensing electrode respectively comprise a central area 71A and four extension areas 71B, as shown in FIG. 7A. The plurality of driving electrodes 72 and the plurality of sensing electrodes 74 form a matrix also comprising a plurality of sensing units. FIG. 7C is a detail view of FIG. 7B. In this embodiment, a sensing unit 70 is defined by two driving electrodes 72 and two sensing electrodes 74. Similarly, between the driving electrode 72 and the sensing electrode 74 lies a gap, which has a projection length, when projected onto an X-Y plane, longer than a total length of two diagonal lines in the sensing unit 70.

Figure 8A:
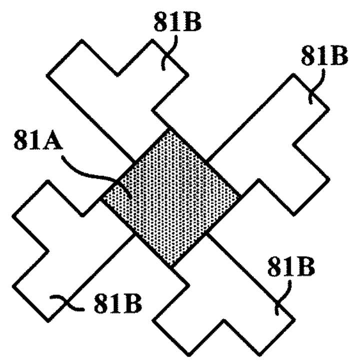
Figure 8B:
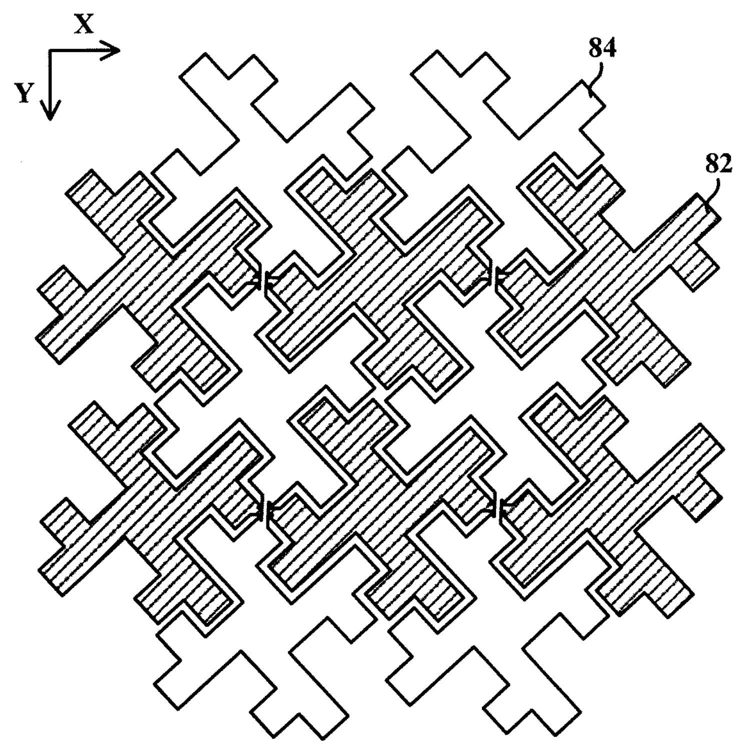
Figure 8C:
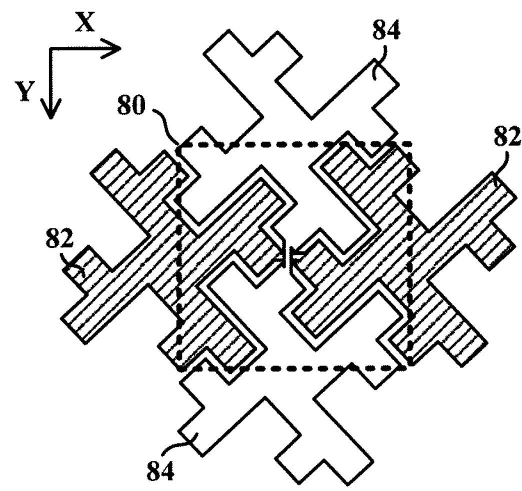

FIG. 8A shows a schematic diagram of a single electrode according to another embodiment; FIG. 8B shows a schematic diagram of a configuration of driving electrodes and sensing electrodes according to this embodiment. In this embodiment, each driving electrode and each sensing electrode respectively comprise a central area 81A and four extension areas 81B, as shown in FIG. 8A. The plurality of driving electrodes 82 and the plurality of sensing electrodes 84 form a matrix also comprising a plurality of sensing units. FIG. 8C is a detail view of FIG. 8B. In this embodiment, a sensing unit 80 is defined by two driving electrodes 82 and two sensing electrodes 84. Similarly, between the driving electrode 82 and the sensing electrode 84 lies a gap, which has a projection length, when projected onto an X-Y plane, longer than a total length of two diagonal lines in the sensing unit 80.

Figure 9A:
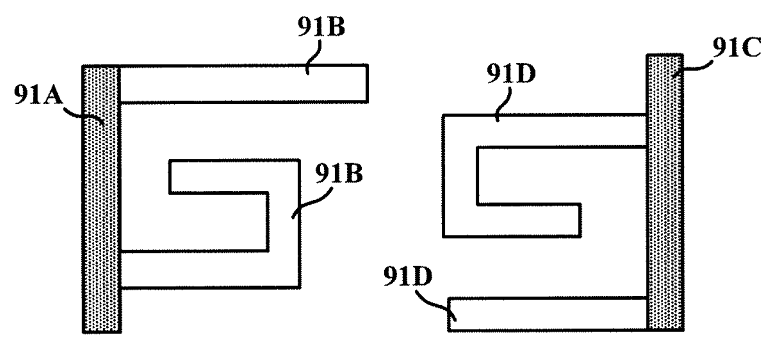
Figure 9B:
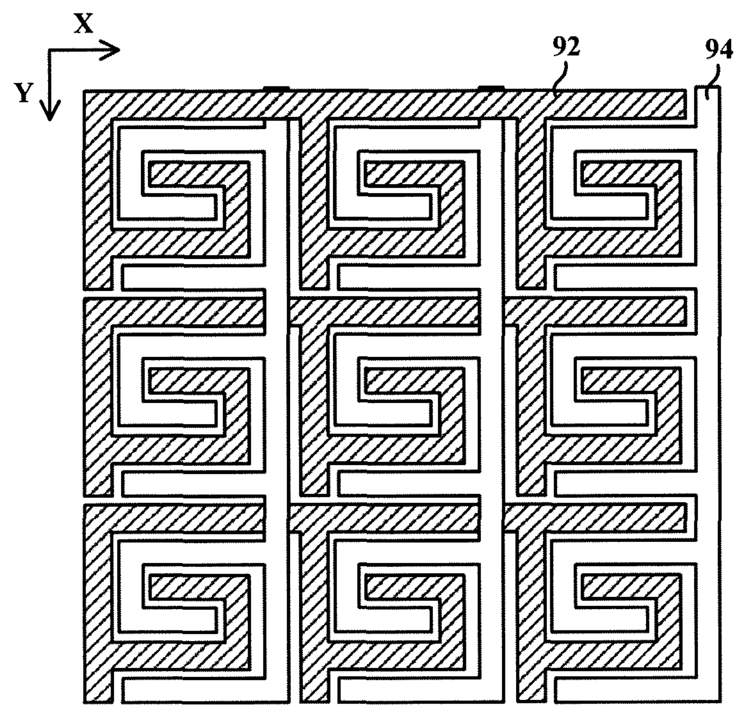
Figure 9C:
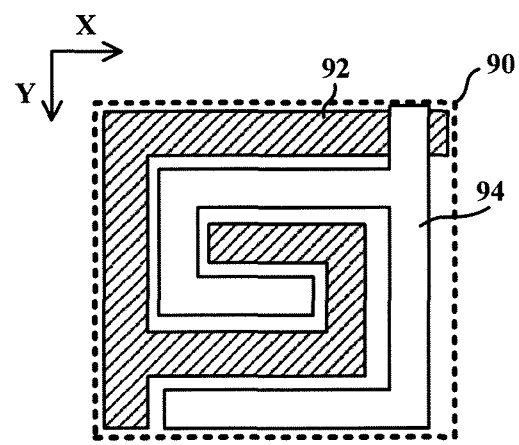

FIG. 9A shows a schematic diagram of a single driving electrode and a single sensing electrode according to another embodiment; FIG. 9B shows a schematic diagram of a configuration of driving electrodes and sensing electrodes according to this embodiment. In this embodiment, each driving electrode comprises a connecting area 91A and two extension areas 91B, and each sensing electrode comprises a connecting area 91C and two extension areas 92D, as shown in FIG. 9A. The plurality of driving electrodes 92 and the plurality of sensing electrodes 94 form a matrix also comprising a plurality of sensing units. FIG. 9C is a detail view of FIG. 9B. In this embodiment, a sensing unit 90 is defined by two driving electrodes 92 and two sensing electrodes 94. Similarly, between the driving electrode 92 and the sensing electrode 94 lies a gap, which has a projection length, when projected onto an X-Y plane, longer than a total length of two diagonal lines in the sensing unit 90.

Apart from providing a greater mutual capacitance variation than the prior art, the above embodiments of the present invention further feature in providing more even mutual capacitance variations. Taking FIG. 3B for example, when a user finger having a width approximating a length of a side of the sensing unit 20 slides across the sensing unit 20 along the X direction, mutual capacitance variations triggered at a center and left and right sides of the sensing unit 20 are smaller while mutual capacitance variations triggered between the center and the left side as well as that between the center and the right side are larger—such mutual capacitance variations are rather uneven. In contrast, more even mutual capacitance variations are obtained when the same test is carried out on the electrode patterns shown in FIGS. 4 to 9.

Figure 10:
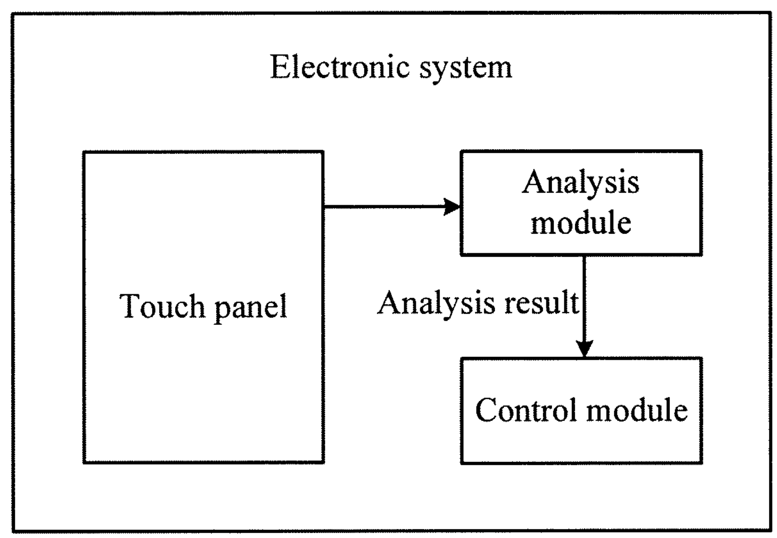
FIG. 10 is a block diagram of an electronic system according to an embodiment of the present invention.

According to another embodiment of the present invention, an electronic system comprising one of the touch sensing devices shown in FIGS. 4A to 9C is provided. As shown in FIG. 10, apart from the touch panel and the electrodes, the electronic system further comprises a control module and an analysis module. The analysis module determines which sensing unit is touched according to output signals from the sensing electrodes. The control module determines a post-touch reaction of the electronic system in response to an analysis result provided by the analysis module. For example, supposing the electronic system is a tablet computer, the control module determines whether to activate or deactivate an application program according to a user action on the touch panel, or to connect multiple touch points to convert into texts/graphics. Details of operations of the touch sensing device in the electronic system are as described in the above embodiments and shall not be further given for brevity.

Therefore, a novel mutual-capacitive touch sensing device is provided by the present invention. Through appropriate designs on shapes and arrangements of driving electrodes and sensing electrodes, a same-sized sensing unit effectively includes a larger area that is affected by a user touch, so as to increase a mutual capacitance variation to equivalently optimize an SNR of a sensing signal. Therefore, the mutual-capacitive touch sensing device and an electronic system including the same of the present invention have outstanding positioning accuracy as well as noise immunity. Compared to the conventional technique that adopts a large potential difference, the mutual-capacitive touch sensing device achieves power saving with less hardware costs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mutual-capacitive touch sensing device, comprising:

a touch panel, substantially parallel to a reference plane;

a plurality of driving electrodes; and a plurality of sensing electrodes, the driving electrodes and the sensing electrodes forming a matrix comprising a plurality of sensing units;

wherein, each of the sensing units is associated with at least one driving electrode and at least one sensing electrode, a gap formed between the at least one driving electrode and the at least one sensing electrode, and a projection length of the gap on the reference plane is longer than a total length of two diagonal lines in each of the sensing units.

2. The mutual-capacitive touch sensing device according to claim 1, wherein each of the driving electrodes and each of the sensing electrodes respectively comprise a central area and a plurality of extension areas, and the extension areas are arranged to surround the central area and are respectively connected to the central area.

3. The mutual-capacitive touch sensing device according to claim 2, wherein the central area of each sensing electrode and the central area of each driving electrode are respectively a rectangular area, the extension areas of each sensing electrode are extended from four sides of the rectangular area, a recess is formed between every two extension areas, where the plurality of the recesses of each sensing electrode respectively accommodate the extension areas of different driving electrodes.

4. The mutual-capacitive touch sensing device according to claim 2, wherein the extension areas of each sensing electrode are substantially a plurality of branch-like areas.

5. The mutual-capacitive touch sensing device according to claim 2, wherein the extension areas of each sensing electrode is substantially a plurality of rectangular areas.

6. The mutual-capacitive touch sensing device according to claim 2, wherein shapes of the sensing electrodes and the driving electrodes are complementary.

7. The mutual-capacitive touch sensing device according to claim 2, wherein shapes of the sensing electrodes and the driving electrodes are symmetrical.

8. The mutual-capacitive touch sensing device according to claim 1, wherein the gap is bent-shaped with at least two turning points, and a projection width of any two random sections of the gap on the reference plane is substantially the same.

9. The mutual-capacitive touch sensing device according to claim 8, wherein the gaps formed in the sensing units have substantially a same shape.

10. The mutual-capacitive touch sensing device according to claim 1, wherein each of the sensing units comprises a part of a driving electrode and a remaining part of another driving electrode, and a part of a sensing electrode and a remaining part of another sensing electrode.

11. The mutual-capacitive touch sensing device according to claim 10, wherein an area of the part of the driving electrode is half of an area of the driving electrode, and the part of the sensing electrode has a half of an area of the sensing electrode.

12. The mutual-capacitive touch sensing device according to claim 1, wherein each of the driving electrodes and each of the sensing electrodes respectively comprise a connecting area and a plurality of extension areas, and the extension areas are arranged at one side of the connecting area and are respectively connected to the connecting area.

13. The mutual-capacitive touch sensing device according to claim 1, wherein a projection width of the gap on the reference plane is between 0.03 um and 0.3 mm.

14. The mutual-capacitive touch sensing device according to claim 1, wherein the gap comprises two neighboring gap sections substantially parallel to each other, and the two gap sections are spaced 0.7 mm to 1 mm apart.

15. The mutual-capacitive touch sensing device according to claim 1, wherein the sensing units render even mutual capacitance variations when a touch event takes place at the sensing units.

16. An electronic system, comprising:

a touch panel, being substantially parallel to a reference plane;

a plurality of driving electrodes;

a plurality of sensing electrodes, the driving electrodes and the sensing electrodes forming a matrix comprising a plurality of sensing units;

an analysis module, for determining whether the sensing units are touched according to a plurality of output signals from the sensing electrodes to generate an analysis result; and a control module, for determining a post-touch reaction of the electronic system in response to the analysis result provided by the analysis module;

wherein, each of the sensing units is associated with at least one driving electrode of the driving electrodes and at least one sensing electrode of the sensing electrodes, a gap formed between the at least one driving electrode and the at least one sensing electrode, and a projection length of the gap on the reference plane is longer than a total length of two diagonal lines in each of the sensing units.

17. The electronic system according to claim 16, wherein each of the driving electrodes and each of the sensing electrodes respectively comprise a central area and a plurality of extension areas, and the extension areas are arranged to surround the central area and are respectively connected to the central area.

18. The electronic system according to claim 16, wherein each of the driving electrodes and each of the sensing electrodes respectively comprise a connecting area and a plurality of extension areas, and the extension areas are arranged at one side of the connecting area and are respectively connected to the connecting area.

19. The electronic system according to claim 16, wherein a width of the gap projected onto the reference plane is between 0.03 um and 0.3 mm.

20. The electronic system according to claim 16, wherein the gap comprises two neighboring gap sections substantially parallel to each other, and the two gap sections are spaced 0.7 mm to 1 mm apart.

21. The electronic system according to claim 16, wherein the sensing units render more even mutual capacitance variations when a touch event takes place at the sensing units.

* * * * *